US011001943B1

(12) United States Patent
Tokarev et al.

(10) Patent No.: US 11,001,943 B1
(45) Date of Patent: May 11, 2021

(54) NANOFIBER SPINNING APPARATUS AND METHOD

(71) Applicant: University of Georgia Research Foundation, Inc., Athens, GA (US)

(72) Inventors: Alexander Tokarev, Athens, GA (US); Oleksandr Trotsenko, Athens, GA (US); Darya Asheghali, Athens, GA (US); Sergiy Minko, Bishop, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 267 days.

(21) Appl. No.: 15/653,253

(22) Filed: Jul. 18, 2017

Related U.S. Application Data

(60) Provisional application No. 62/372,119, filed on Aug. 8, 2016.

(51) Int. Cl.
| | |
|---|---|
| *D01D 5/098* | (2006.01) |
| *D01F 6/66* | (2006.01) |
| *D01D 5/02* | (2006.01) |
| *D01D 5/06* | (2006.01) |
| *D01D 5/16* | (2006.01) |
| *D01D 5/24* | (2006.01) |

(Continued)

(52) U.S. Cl.
CPC .............. *D01D 5/098* (2013.01); *D01D 5/02* (2013.01); *D01D 5/06* (2013.01); *D01D 5/16* (2013.01); *D01D 5/24* (2013.01); *D01D 7/00* (2013.01); *D01F 6/66* (2013.01); *B82Y 30/00* (2013.01); *B82Y 40/00* (2013.01); *D10B 2331/06* (2013.01); *D10B 2509/06* (2013.01)

(58) Field of Classification Search
CPC ...................................................... D01D 5/16
See application file for complete search history.

(56) References Cited

U.S. PATENT DOCUMENTS

| | | | | |
|---|---|---|---|---|
| 4,417,595 | A | * | 11/1983 | Okumura ................. A46B 3/16 132/313 |
| 2015/0072008 | A1 | * | 3/2015 | Tornero Garcia ... A61K 9/7007 424/486 |
| 2019/0352803 | A1 | | 11/2019 | Sharma et al. |

OTHER PUBLICATIONS

Tokarev, A., Asheghali, D., Griffiths, I.M., Trotsenko, O., Gruzd, A., Lin, X., Stone, H.A. and Minko, S. (2015), Touch-and Brush-Spinning of Nanofibers. Adv. Mater., 27: 6526-6532. doi:10.1002/adma.201502768 (Year: 2015).*

(Continued)

*Primary Examiner* — Galen H Hauth
(74) *Attorney, Agent, or Firm* — Thomas|Horstemeyer, LLP; Stephanie Davy-Jow

(57) ABSTRACT

A simple controllable set-up for drawing single filament nanofibers from polymer solutions or melts using a rotating rod or a set of rods (round brush) is described. The set-up can be assembled in a few minutes and applied to fabricate customized nanofiber scaffolds and meshes for various applications. The resulting fiber diameter is controlled precisely in the range 40 nm to 5 μm by adjusting the rotational speed and polymer concentration. Owing to the simple design and capability to manipulate single nanofibers, the spinning set-up can be used to wind a single filament into unidirectional, orthogonal or randomly oriented 2D and 3D meshes with controlled density, thickness and combinations of different fibers and materials in the scaffolds. The method is scalable and can be implemented easily for laboratory and industrial manufacturing.

14 Claims, 7 Drawing Sheets

(51) Int. Cl.
*D01D 7/00* (2006.01)
*B82Y 30/00* (2011.01)
*B82Y 40/00* (2011.01)

(56) References Cited

OTHER PUBLICATIONS

Tokarev, Alexander, et al. "Magnetospinning of nano-and microfibers." Advanced Materials 27.23 (2015): 3560-3565. (Year: 2015).*
U.S. Appl. No. 62/672,416, filed May 16, 2018.

* cited by examiner

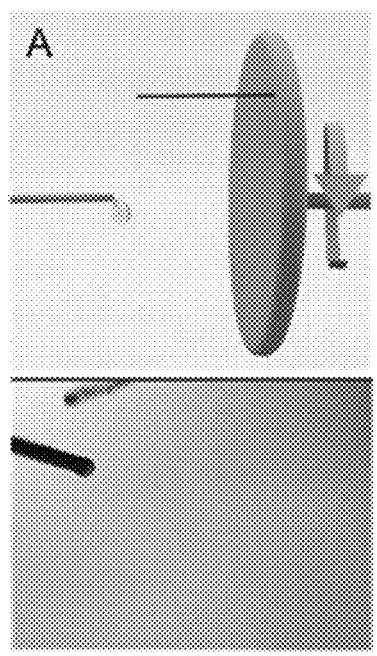 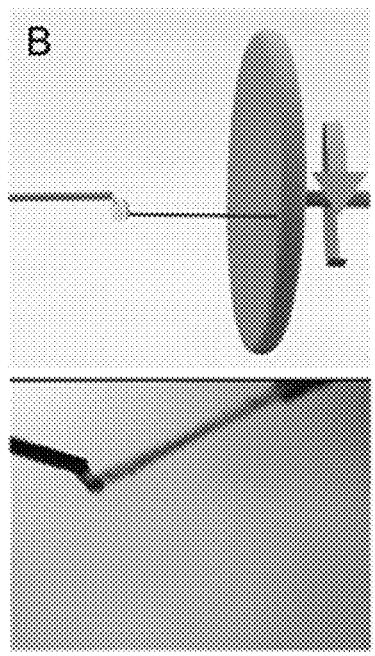 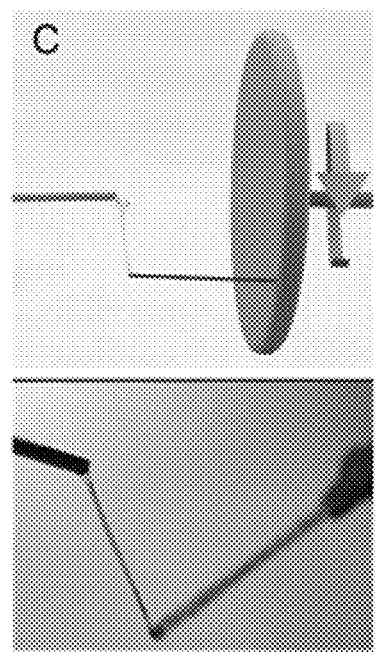
FIG. 1A  FIG. 1B  FIG. 1C
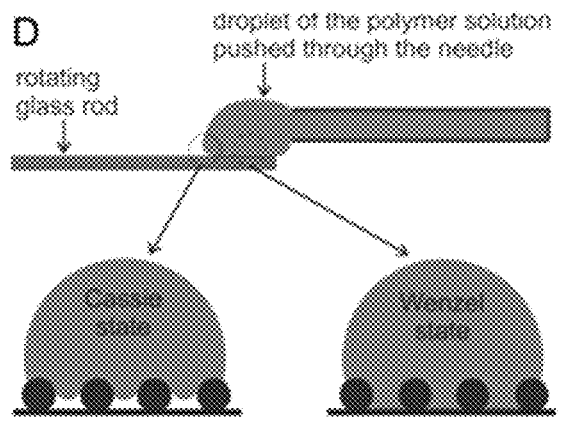 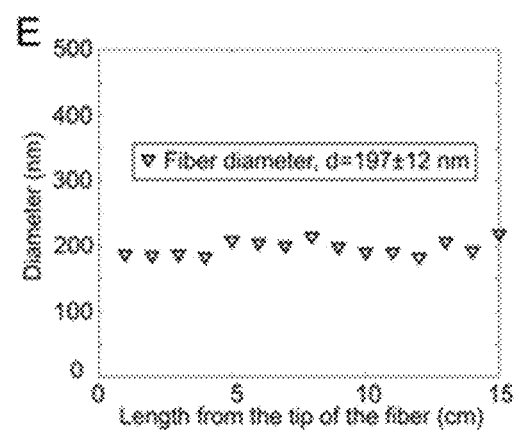
FIG. 1D  FIG. 1E
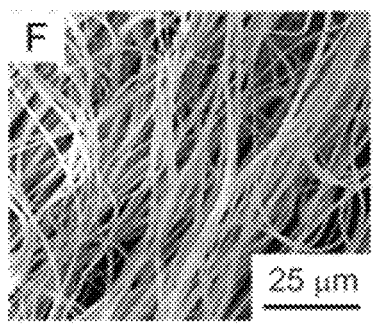 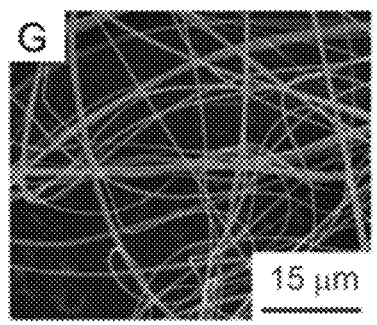 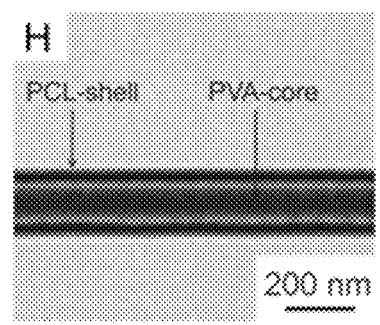
FIG. 1F  FIG. 1G  FIG. 1H

NANOFIBER SPINNING APPARATUS AND METHOD

PRIORITY

This nonprovisional patent application claims the benefit of US Provisional Patent Application No. 62/372,119, filed Aug. 8, 2016 and entitled NANOFIBER SPINNING APPARATUS AND METHOD, the entire contents of which are incorporated herein by reference and relied upon for all purposes.

BACKGROUND

In the past decade polymer nanofibers have found applications in many different areas such as bone and tissue regeneration, biosensors, fuels cells, design of composites and polymer nanofiber films. Water/air purification systems, personal care products and membranes utilize the high surface area of nanofibers to enhance transport and filtration properties while nanofibers with tunable conductivity and molecular memory are promising building blocks for miniaturized devices. Currently electrospinning is the most popular method for nanofiber production. In this method a droplet of polymer solution is stretched to form a fiber by a high-voltage electric field. Electrospinning requires high voltages (20-30 kV) and depends strongly on the dielectric properties of materials that call for adjustment of spinning solutions and experienced operators of the spinning set-up. Fibers are deposited on collectors (plane electrodes or frames) or rotating electrodes of a cylindrical shape for the fabrication of 2D and 3D fibrous nonwoven structures.

The recent discovery of the ability of nanofibers to help to form bones and tissues in combination with stem cells has resulted in a significantly increased interest in the development of simple methods for nanofiber fabrication that can be conducted in biological and biomedical laboratories. However, problems of antigenicity and immunogenicity of a donor's biological materials, as well as specific needs in the shapes, dimensions and morphologies of tissue implants call for the fabrication of customized scaffolds that can be engineered and fabricated at a health-provider facilities.

A method of nanofiber fabrication is direct drawing from a polymer solution using a glass micropipette. This method however was not scaled up and thus did not find practical applications.

BRIEF SUMMARY

In an embodiment, a method of spinning a nanofiber includes feeding a nanofiber-forming solution to an apparatus comprising a cylinder rotatably mounted on an spindle comprising an outer wall, a rod comprising an outer end and a fixed end wherein the fixed end is mounted on the outer wall, wherein the outer end is configured to touch the nanofiber forming solution while rotating about an axis defined by the spindle.

In an embodiment, an apparatus includes a substantially flat stage comprising a first and second surface wherein the first surface is rotatably mounted on a first spindle and a winding rod mounted on the second surface substantially orthogonal to the second surface and offset from an axis defined by the first spindle; and wherein the winding rod is configured to rotate about a 3d-nanofiber building template rotatably mounted on a second spindle; and a feed tube configured to dispense a nanofiber-forming solution to the winding rod.

In an embodiment, a method of forming a nanofiber structure includes feeding a nanofiber-forming solution to: an apparatus comprising a substantially flat stage comprising a first and second surface wherein the first surface is rotatably mounted on a first spindle and a winding rod mounted on the second surface substantially orthogonal to the second surface and offset from an axis defined by the first spindle; and wherein the winding rod is configured to rotate about a 3d-nanofiber building template rotatably mounted on a second spindle; and a feed tube configured to dispense a nanofiber-forming solution to the winding rod; and rotating the flat stage about the first spindle such that a nanofiber is spun to a predetermined diameter.

In an embodiment, a cylindrical hairbrush as known to those of skill in the art, for use in forming a nanofiber.

BRIEF DESCRIPTION OF THE SEVERAL VIEWS OF THE DRAWING

FIG. 1A depicts a glass rod glued to a rotating stage and a droplet of the polymer solution is pushed through the needle with an automated pump.

FIG. 1B depicts the rotating glass rod of FIG. 1A as it touches the droplet of the polymer solution.

FIG. 1C depicts the glass rod of FIGS. 1A and 1B as the rod continues rotation and a liquid bridge is formed between the glass rod and the needle tip. The liquid bridge solidifies upon solvent evaporation (or cooling for polymer melts) and fibers are collected along the edge of the rotating stage on mounted bars (not shown here).

FIG. 1D depicts the glass rod of FIGS. 1A, 1B, and 1C rotating and touching the polymer solution droplet at a high speed. The local pressure overcomes the breakthrough pressure and results in transition to the Wenzel complete wetting while further spreading of liquid outside the high pressure area is limited by partial wetting and non-wetting Cassie states.

FIG. 1E depicts measurements of the fiber diameter along a 15 cm length.

FIG. 1F is a scanning electron micrograph (SEM) image of PEO nanofibers spun according to the present description.

FIG. 1G is a scanning electron micrograph (SEM) image of Teflon® nanofibers spun according to the present description.

FIG. 1H is a Transmission electron microscopy (TEM) image of core-shell polyvinyl alcohol (PVA)-polycaprolactone (PCL) nanofiber.

FIGS. 6A-C show tensile/physical properties of some of the nanofibers prepared according to the present disclosure.

FIGS. 7A-C are optical microscopy image representations of a 3D nanofiber scaffold prepared by the method described in EXAMPLE 4, FIGS. 4G, 4H, and 4I.

DETAILED DESCRIPTION OF EMBODIMENTS OF THE INVENTION

Figures 2A, 2B:
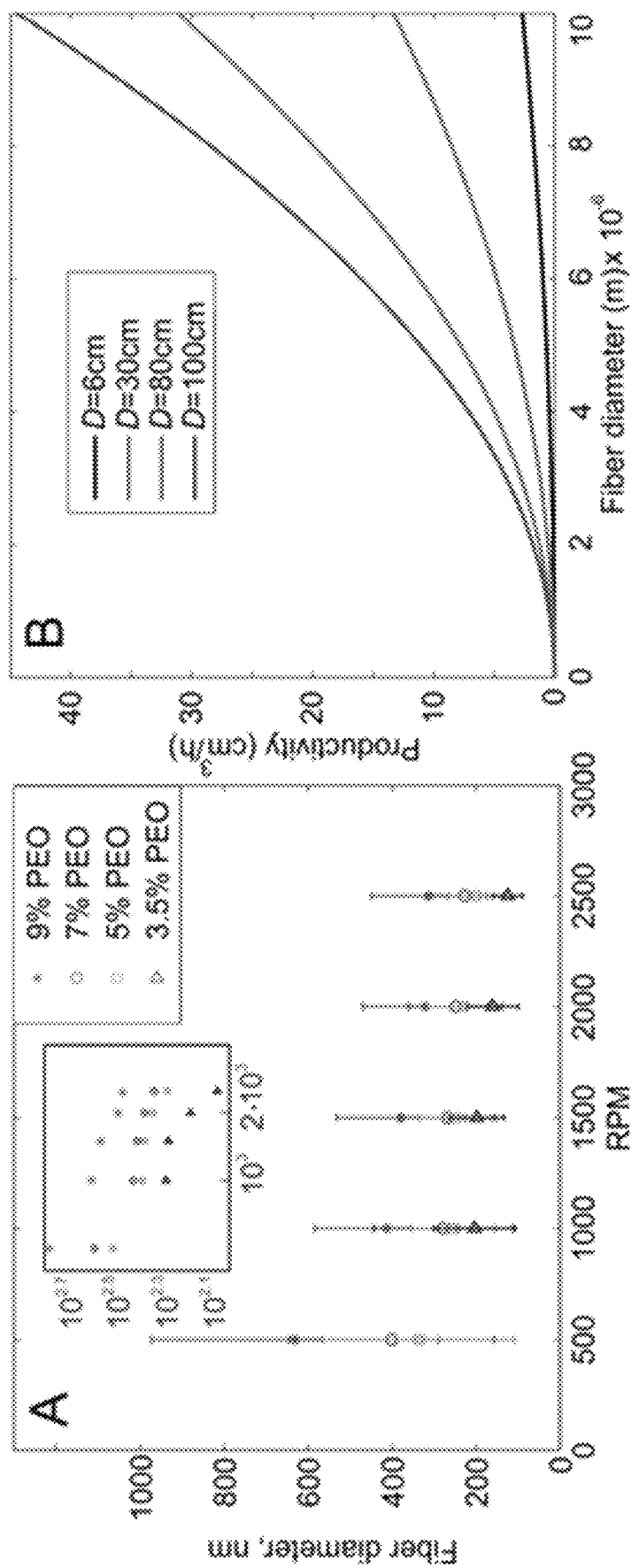
FIG. 2A is a graphic representation of the nanofiber diameter as a function of cylinder rotation speed and polymer solution concentration, according to the present description.
FIG. 2B is a graphic representation of the productivity of an apparatus of the present description as a function of fiber diameter and stage, or disk, speed.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

In an embodiment, a glass rod (0.3 mm to a few mm in diameter) is glued in a transverse orientation, e.g., an orthogonal orientation, to the direction of a rotating stage (e.g., a disk), whose diameter can be chosen over a wide range of a few cm to more than one meter (FIG. 1A). The stage can be of any two dimensional cross-sectional configuration, e.g., circular, triangular, square, or a polygon of n sides, wherein n is an integer from 3 to 12.

In another embodiment the body may be a resilient body, or resilient rod, e.g., a hairbrush rod, anchored on the outer surface of the cylinder and turns synchronously with the rotating cylinder.

In an embodiment, the cylinder may comprise an outer surface of wherein the outer surface defines a diameter of the cylinder. The diameter so defined may be from 1 to 200 cm, or from 2 to 100 cm, or from 3 to 100 cm, or from 3 to 90 cm, or from 3 to 80 cm, or from 6 to 80 cm, or from 6 to 50 cm, or from 6 to 30 cm.

In an embodiment, the rods may be of length as needed, e.g., from 0.2 to 10 cm, or from 0.2 to 5 cm, or from 0.5 to 2 cm.

In an embodiment, the rods may be placed in density along the cylinder surface at a ratio of from $10/cm^2$ to $100/cm^2$ or from $10/cm^2$ to $50/cm^2$ or from $10/cm^2$ to $20/cm^2$.

In an embodiment, the cylinder may rotate at a frequency of from 20 revolutions/min (RPM) to 10000 RPM, or from 50 RPM to 10000 RPM, or from 100 RPM to 5000 RPM, or from 500 RPM to 5000 RPM or from 1000 RPM to 2500 RPM.

In an embodiment, a polymer solution is supplied, for example, from the needle of a syringe pump that faces the glass rod. The distance between the droplet of polymer solution and the tip of the glass rod is adjusted so that the glass rod contacts the polymer droplet as it rotates (FIG. 1B). Following the initial "touch", the polymer droplet forms a liquid bridge. As the stage rotates the bridge stretches and the fiber length increases, while the diameter decrease due to mass conservation (FIG. 1C). The surface area of the liquid thread increases with its elongation and thus generates a larger surface area for eventual solvent evaporation from the thread. For a polymer melt, the fiber drawing is followed by cooling and crystallization of the polymer.

In an embodiment, the present method may provide polyethylene oxide (PEO) fibers from aqueous solutions. In an embodiment, the glass rod may be coated with a fluorinated hydrocarbon, e.g., 1H,1H,2H,2H-perfluorodecyltriethoxysilane. The modification with fluorosilane aids in avoiding accumulation of the polymer on the glass rod surfaces due to non-wetting or partial wetting, thus providing conditions for excellent reproducibility of fiber drawing due to the self-cleaning properties of the rod. The same results were obtained for superhydrophobic and superoleophobic coatings of the rod surface (see SM). The pressure ($\sim 10^6$ Pa) generated when the rotating rod hits the droplet is much greater than the breakthrough pressure for typical composite surfaces with a re-entrant geometry ($\sim 10^3$ Pa). This results in a transition from Cassie to the fully wetted Wenzel state (FIG. 1D), causing wetting hysteresis. For polymer solutions in aqueous and organic solvents, all of the coatings were found to have no build-up of polymer layers on the surface of the rod. Our results demonstrate that the touch-spinning method can be realized when the wetting behavior of the rod is optimized to non-wetting or partial wetting conditions with wetting hysteresis.

Examples of touch-spun PEO nanofibers are shown in the SEM image in FIG. 1F. The resulting fibers are very close to homogeneous in diameter along the fiber length (FIG. 1E). This method is not sensitive to the dielectric properties of the polymer solutions and thus can be used to draw a range of fibers from various polymer solutions and melts. For example, Teflon® nanofibers can be fabricated by electrospinning only if blended with another polymer since Teflon® is only soluble in liquids with low dielectric constants.

In another embodiment Teflon® nanofibers are spun from a solution of TAF 1600 (copolymer of 2,2-bis(trifluoromethyl)-4,5-difluoro-1,3-dioxole) in Fluorinert® FC-40 fluid with dielectric constant 1.9 (FIG. 1G).

In another embodiment, the touch-spinning method can also be used for drawing fibers from polymer melts. For example, touch-spun polyethylene microfibers were drawn from polyethylene (PE) melted by a heat gun at 150° C. (see SM for an optical microscope image of a PE fiber). Similarly, the method to may produce core-shell PVA-PCL nanofibers (FIG. 1H).

In an embodiment, nanofiber diameter can be varied, or selected by changing the rotation speed of the stage or the concentration of the polymer solution. FIG. 2A summarizes variations in fiber diameter as a function of PEO concentration in the range from about 3.5 to about 9 wt % and as a function of rotational speed in the range 500-2500 revolutions per minute (RPM). In an embodiment, nanofiber diameter decreases with increasing rotational speed and decreasing polymer concentration. The error bars show the standard deviation of the fiber diameter in a series of experiments, and are comparable with those for fibers made using other traditional nanofiber spinning methods. In each series the standard deviation was measured for one hundred 15 cm long fibers in different samples of the same batch along the fiber's length. For example, the standard deviation for 125 nm fibers is ±36 nm (all values are presented in FIG. 2A as error bars).

A series of experiments with different diameters of glass rods (from 0.33 mm to 1.8 mm) and different wetting properties of the surface of the rods (water contact angle from 0° to 160°) demonstrated no effect on the fiber diameter, which indicates that the fiber diameter is a function of the interplay of parameters for stretching of the polymer liquid formed between the surface supplying the polymer liquid and the tip of the glass rod, as discussed below. The wetting behavior of the rotating rod is critical to avoid contamination of the rod with polymer deposits and has no effect on the fiber diameter (see SM for details). The rate of production of fibers in touch-spinning ($V_p$, cm$^3$/h) clearly depends on the diameter of the rotating stage ($D_s$), rotational speed ($\omega$) and fiber radius ($R_f$)~$V_p$=$\pi R_f^2(\pi D_s \omega)$. $V_p$=$\pi R_f^2$ [$\pi R_s \omega k_1 k_2$] The productivity of the method estimated for a single rod is in the same range as for electrospinning (23) (FIG. 2B).

In an embodiment, the method may provide nanofibers with a substantially uniform diameter (FIG. 1E). This feature arises as a result of the drawing process, which thins the fiber via two distinct mechanisms: axial stretching due to the rotation of the stage and capillarity action, which acts to drain fluid from the fiber back into the source droplet.

In an embodiment, the method includes a predictive mechanism for nanofiber formation: the fiber formation may be described by the following differential equation:

$$\frac{\partial}{\partial t}(R^2) + \frac{\partial}{\partial z}(R^2 \omega) = -\alpha R,$$

$$\rho R^2 \left( \frac{\partial \omega}{\partial t} + \omega \frac{\partial \omega}{\partial z} \right) = \frac{\partial}{\partial z}\left( 3\mu R^2 \frac{\partial \omega}{\partial z} \right) + \gamma \frac{\partial R}{\partial z} (1a, b)$$

wherein R is fiber radius, w fluid velocity, z the axial position along the fiber, $\rho$, $\gamma$ and $\eta$ the fluid density, surface tension and viscosity respectively, and a is a coefficient characterizing the evaporation rate. For the touch-spinning operating regimes the reduced capillary number, $\varepsilon Ca$=$\mu W/\gamma \ll 1$, where $\varepsilon$ is the typical fiber aspect ratio of diameter to length, and W is the speed of the rod at the tip. In this limit, Eq. (1b) reduces to $\partial R/\partial z$=0 and so R=R(t) only. This result indicates that surface tension will act to smooth out any axial variations in radius and hence we expect to observe uniform thinning for the bulk of the fiber, with variations in the fiber radius constrained to a small boundary layer of order $\varepsilon Ca$ times the fiber length near the droplet end. Within this end boundary layer, surface-tension effects are important and capillary suction will act to drain liquid from the bulk fiber into the droplet(26). Consequently, following drawing the resulting fiber will be approximately uniform along its entire length.

In an embodiment, method of forming a nanofiber takes place on a short (millisecond) timescale: following fracture of the fiber, drawing ceases. The process takes from e.g., 2-20 milliseconds, or from 10 to 20 milliseconds. Thereafter the fiber diameter decreases on a longer timescale (of the order of seconds) due to evaporation. In the first stage the polymeric fluid undergoes significant strains, on the order of the square of the ratio of the initial to final fiber diameters. Under such strains, the viscosities of polymeric fluids become very large, and so under the short drawing timescale the polymers within the fluid will have insufficient time to reorganize. In Eq. (1) this corresponds to a dependence of viscosity p on extension rate, $\partial w/\partial z$. Due to the uniform nature of the fiber shape during the drawing stage before fracture, the fiber will also continue to thin uniformly during the evaporation stage. As a result, both the drawing and evaporation stages ensure that uniform fibers are generated, as observed in FIGS. 1A-H and as also found in other spinning processes.

In an embodiment, the diameter of the fibers fabricated by the touch-spinning process may be selected, or tailored, for example, by adjusting the speed of the top of the rod, W, or the polymer concentration (FIG. 2A). We find that the empirically observed fiber diameter R that results from touch-spinning obeys an approximate power-law relation R~$W^{-\beta}$, where $\beta$<1/2. This result implies a weaker dependence of fiber diameter on rotation speed than in the case of steady fiber drawing in the absence of evaporation (in which case $\beta$=1/2). This reduced dependence may be rationalized by the fact that, although the fiber diameter is reduced with increasing draw speed, the volume of fluid taken up by the glass rod during contact increases with rotation rate thus diminishing the strength of the power law, which documents how the extracted volume depends on the speed of withdrawal for a model geometry).

The final fiber diameter is also observed to increase with concentration of PEO (FIG. 2A), which we identify with an increase in viscosity. This result may be attributed to the fact that a viscosity increase raises the axial viscous stresses, which impedes the stretching. We note that the inclusion of evaporation in Eq. (1a) also adjusts the value of $\beta$.

Figure 3A:
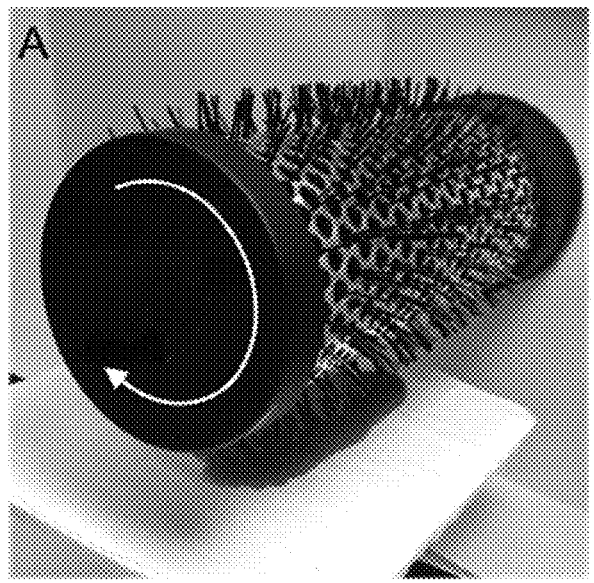
FIG. 3A is a representation of a round hairbrush attached to a rotating motor and a PEO solution poured onto a Teflon substrate. PEO solution is mixed with green dye for visualization purposes.
Figure 3B:
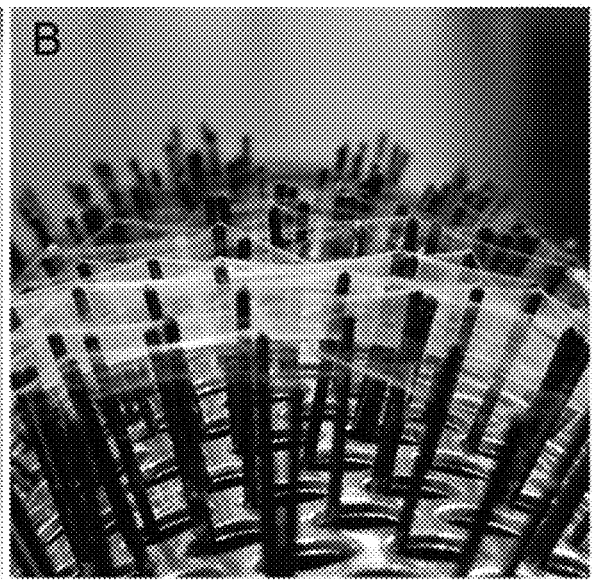
FIG. 3B is a representation of nanofibers collected on the hairbrush of FIG. 3A rotated at 3000 RPM for 1 min.
Figure 3C:
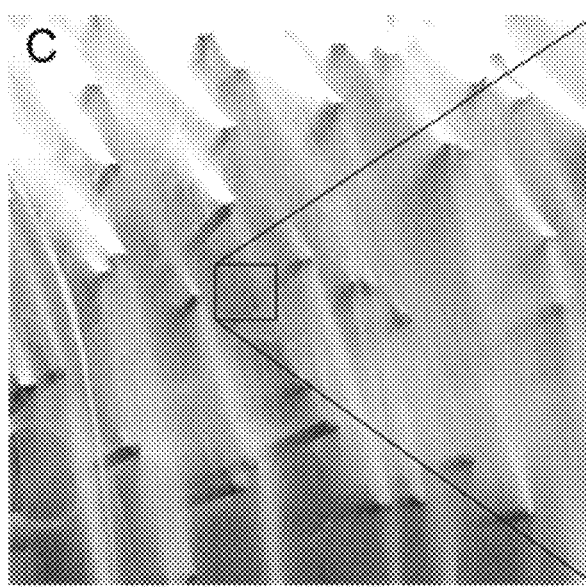
FIG. 3C is a representation of nanofibers collected on the hairbrush of FIG. 3A rotated at 3000 RPM for 5 min.
Figure 3D:
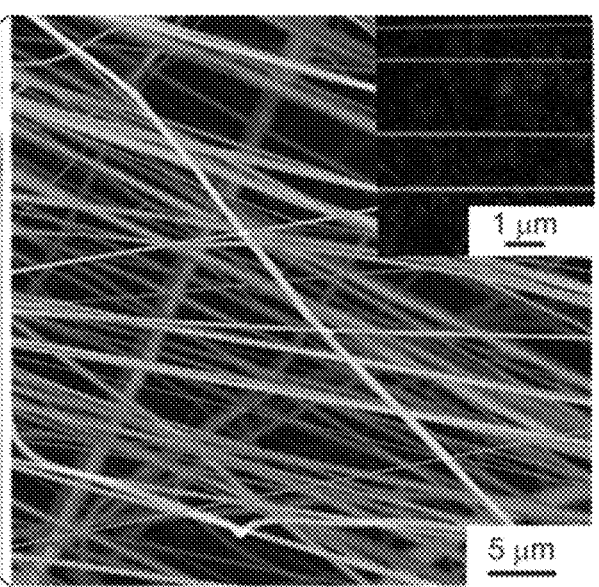
FIG. 3D is an SEM image of brush-spun nanofibers of FIGS. 3B and 3C.

We have also demonstrated the simplicity and scalability of this new touch-spinning method by using a round hairbrush composed of the order of 600 filaments (FIG. 3A). The brush was attached to an electrical motor via the brush grip. The set-up was fed by a PEO solution poured onto a Teflon film placed underneath the round brush so that the brush filaments touched the droplets of the polymer solution but did not scratch the film. (In FIG. 3A PEO solution is mixed with green dye for visualization purposes.) Nanofibers were brush-spun from the free-liquid surface with a rotating hair brush. FIGS. 3B-C show the 200 nm nanofibers produced in 1 and 5 minutes respectively at 3000 RPM, and an SEM image of the resulting fibers is shown in FIG. 3D. The total length of the fibers produced by the 600-filament brush with D=60 mm at 3000 RPM in 5 minutes is 1700 km, which is a sufficient amount for a typical tissue-engineering experiment.

Depending on the rotational mode of the spinning frame, the touch-spinning process enables both regular and random fiber meshes and continuous single free-standing nano and micro-fibers. For example, a rotating stage with a diameter of 5 cm was used to produce single free-standing 15 cm-long polyacrylonitrile (PAN) micro and PCL nanofibers. Deviation of the fiber diameter along their length and between different batches is in the range 3-5%. The Young's modulus of PCL fibers with diameters from 650 to 800 nm was measured to be 0.26±0.08 GPa, using a three-point bending test and an Atomic Force Microscope (AFM) (detailed procedure described in SM). Such results are comparable with the mechanical properties of PCL fibers produced by other common methods.

Figure 4A:
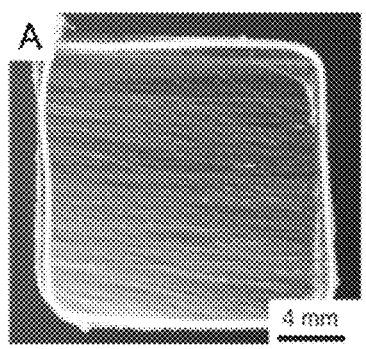
FIGS. 4A-N provide a series of representation of the results of EXAMPLE 4.
Figure 4B:
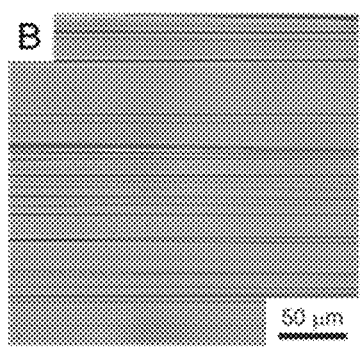
Figure 4C:
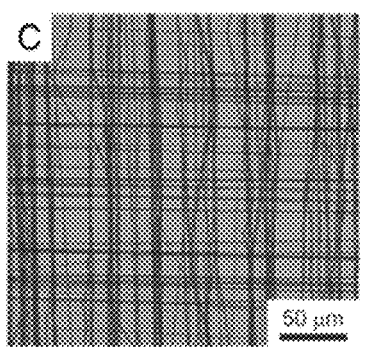
Figure 4D:
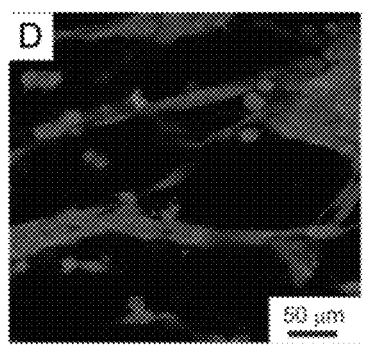
Figure 4E:
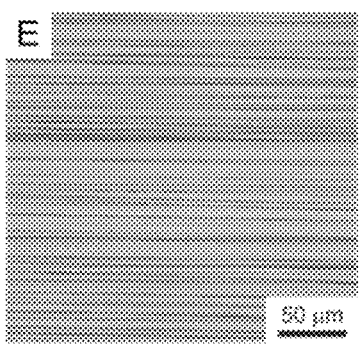
Figure 4F:
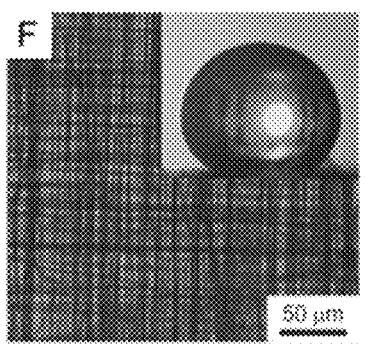
Figure 4G:
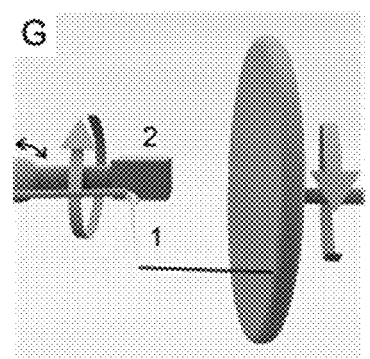
Figure 4H:
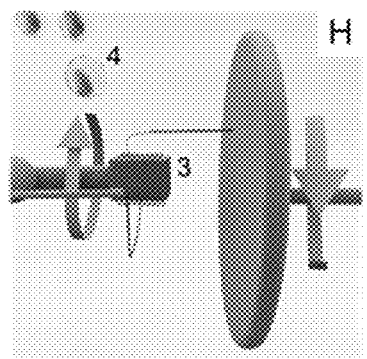
Figure 4I:
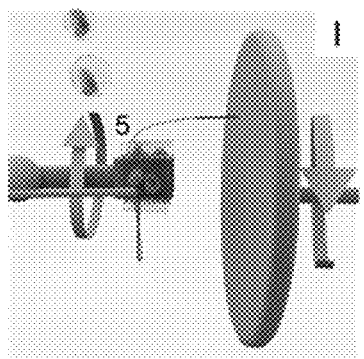
Figure 4J:
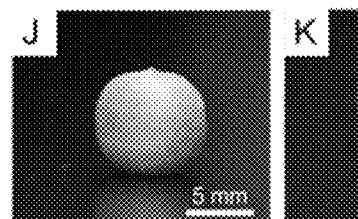
Figure 4K:
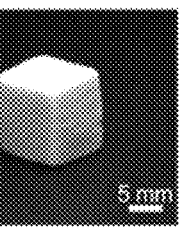
Figure 4L:
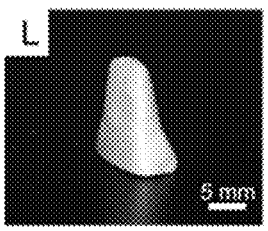
Figure 4M:
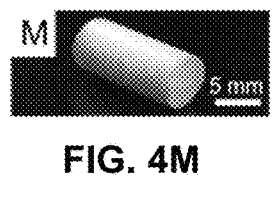
Figure 4N:
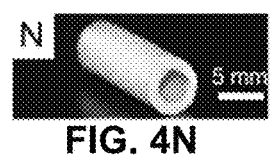
Figure 5:
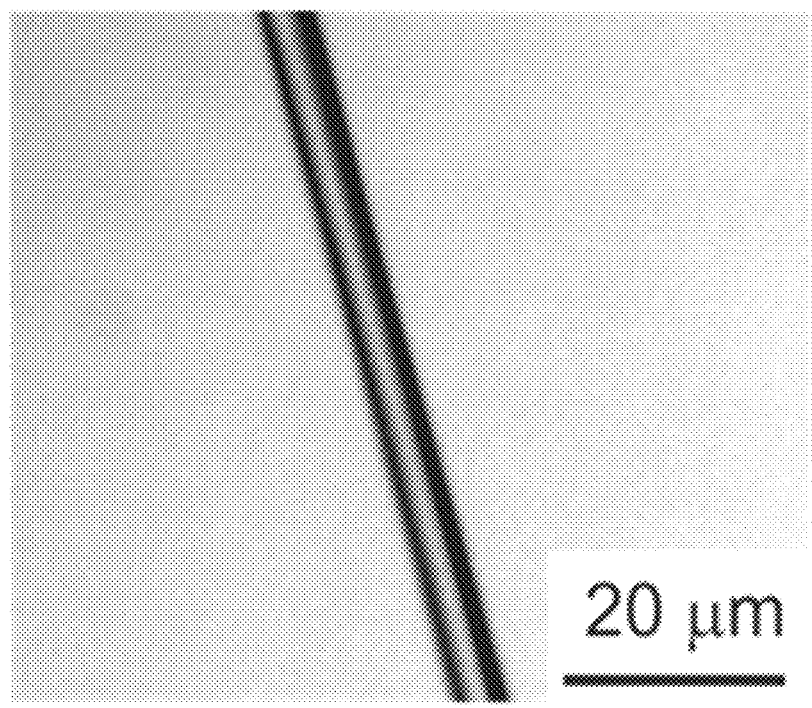
FIG. 5 is a representation of an optical microscopy image of a melt-spun polyethelene fiber prepared according to the present disclosure.
Figures 7A, 7B:
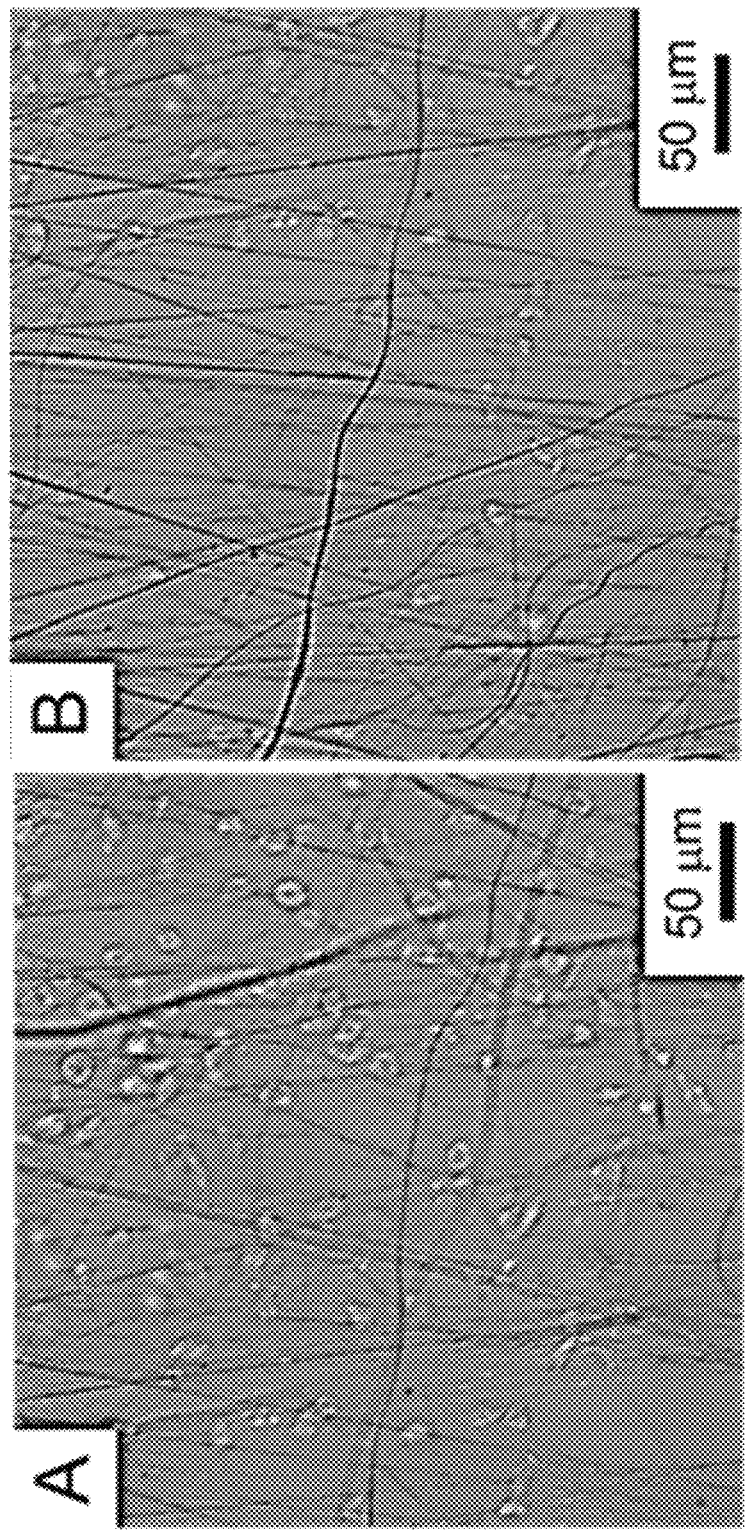

The essential difference of the touch-spinning method from other commonly used methods of nanofiber fabrication is in the mechanical control and manipulation of nanofibers that it offers. In contrast to all other methods, in touch-spinning single filament nanofibers are drawn by the mechanical force that determines not only fiber stretching but also guides fibers onto the spool providing better control over fiber alignment. For example, considering applications of nanofibers for tissue engineering scaffolds, touch-spinning offers a very fast and practical method to produce scaffolds for cells with controlled mesh size in virtually any laboratory facility with no special requirement for equipment and training of personnel. For example, a supporting frame 15×15 mm size was placed behind the touch-spinning needle and fibers were collected on the frame (FIGS. 4A, 4B). After 2 minutes the frame was rotated by 90° and touch-spinning was continued for 2 further minutes resulting in a 28±7 µm square mesh (FIG. 4C). The mesh size can be controlled by adjusting the time of touch-spinning: 4 minutes of touch-spinning produced a mesh with size 5.8±1 µm (FIGS. 4E, 4F). The PCL meshes were successfully tested for scaffolding mouse breast cancer cells (FIG. 4D). Owing to its very simple set-up (FIGS. 4G-I), the highly cellularized wet 3D-scaffolds (SM, FIGS. 7A-B) can be fabricated by combining fiber winding with simultaneous spraying of cells. The examples illustrated in FIGS. 4J-N demonstrate the capability of the touch-spinning method for fabrication of biomimetic scaffolds on different scales from macroscopic shape and dimensions to microscopic fiber dimensions and alignment into various meshes that are relevant to mesh-like structures in human tissues.

Applications of the method developed are obviously not limited to tissue engineering scaffolds and extend to any other nanofiber application, for example filtration when fibrous filters with a demanded mesh size can be prepared by simple winding of nanofibers as shown in FIGS. 4A-C. Another obvious example is the fabrication of fibrous superhydrophobic coatings. Here, Teflon nanofiber meshes were tested for the fabrication of superhydrophobic surfaces (inset in FIG. 4F).

In this report, we describe a new method for drawing nanofibers. The method is based on a very simple and inexpensive set-up that does not require special training or skills. Using this method, nanofibers can be drawn in any non-specialized laboratory. It is possible to build a touch-spinning set-up by gluing a surface-modified glass rod to a rotating stage from which fibers can be spun from a free-liquid surface. A simple hairbrush can be used to scale up the fiber drawing to spin kilometers of nanofibers per minute. Owing to the set-up's simplicity and ability to manipulate nanofibers, 2D and 3D customized scaffolds of different dimensions, shapes, mesh sizes, fiber alignments and combinations with biological materials can be easily fabricated in minutes.

EXAMPLES

EXAMPLE 1: Surface modification of the glass rod. Preparation of superhydrophobic surface: The glass rods (glass fibers) were cleaned in 1:1 ammonium hydroxide (50% v/v, VWR)/hydrogen peroxide (30%, Ward's Science) for 40 minutes. Following this, they were rinsed with deionized water. The glass rods were immersed for 15 hours in 2% 1H,1H,2H,2H-perfluorodecyltriethoxysilane (97%, Matrix Scientific) in toluene and then rinsed with toluene and ethanol (200 proof, KOPTEC) to remove any excess fluorosilane.

EXAMPLE 2: Preparation of superomniphobic surface: Superomniphobic surfaces were obtained by spraying 8% wt. aqueous solution silicon carbide microrods. The average diameter and length of rods are 600 nm and 7 µm, respectively. The formation of silicon-carbide-rod aggregates was achieved in specially adjusted spraying conditions. Deposition of these aerosol-assisted self-assembled structures led to production of re-entrant two-length-scale surface textures that help to stabilize the non-wetting regime. Following the deposition, the surface was functionalized with perfluorooctyltriethoxysilane.

EXAMPLE 3: Cell culture: The mouse 4T1 breast tumor cells used for the present cultures were provided by Dr. Jin Xie, University of Georgia, USA. The growth medium consisted of Dulbecco's Modified Eagle's Medium (DMEM) containing 10% (v/v) fetal bovine serum with antibiotics. Cell cultures were maintained in a 37° C. incubator in a humidified atmosphere containing 5% $CO_2$. The cells were passaged at confluence using a standard trypsin protocol. The scaffolds made of PCL nanofibers were sterilized by UV light for 30 min. The nanofibers were then subjected to a rough collagen coating by immersing the nanofibrous scaffolds into a solution of calf skin collagen (0.1% solution in 0.1 M acetic acid) overnight. Afterward, the constructs were washed three times with PBS and kept air-dried. The 4T1 cells were seeded ($1 \times 10^5$ cells/cm$^2$) and cultured on the collagen-coated fibers in petri dish culture plates for 2 days. Cell seeded scaffolds were then rinsed in phosphate buffered saline, fixed in 3.7% formaldehyde solution and permeabilised with 1% (w/v) Bovine serum albumin (BSA) prior to incubation with fluorescein-tagged phalloidin (Life technology, NY, USA) at 0.1 mg/ml for 30 min. The cells were visualized using the 488 nm laser of a Zeiss LSM 710 inverted confocal microscope with a ZSMmeta head (Welwyn Garden City, UK). The images were analyzed using Image Pro Plus. The mouse NIH-3T3 fibroblast cells used for the present cultures were purchased from ATCC, USA. Dulbecco's Modified Eagle's Medium (DMEM) containing 10% (v/v) fetal bovine serum with antibiotics was used for cell growth. Cell cultures were maintained in a 37° C. incubator in a humidified atmosphere containing 5% CO2. Cells were passaged at confluence using a standard trypsin protocol. Cells were washed twice and stored in PBS buffer.

EXAMPLE 4: FIG. 4A-K depict the various embodiments of the present disclosure. Nanofiber meshes with controlled mesh size for tissue engineering and filtration applications are depicted. (FIG. 4A) A 15×15 mm metallic frame size is placed behind the touch-spinning needle and fibers are collected on the frame. (FIG. 4B) Optical microscopy image of fibers on the frame produced after 2 minutes of touch-spinning. (FIG. 4C) After 2 minutes the frame was rotated by 90° and touch-spinning was continued for 2 further minutes resulting in a 28±7 µm square mesh. (FIG. 4D) Confocal image of the mouse breast cancer cell grown on the mesh. (FIG. 4E) Optical microscopy image of fibers on the frame produced after 4 minutes of touch-spinning. (FIG. 4F) After 4 minutes the frame was rotated by 90° and touch-spinning was continued for 2 further minutes resulting in a 5.8±1 µm size mesh. Inset shows water droplet on the mesh of Teflon nanofibers (contact angle=154°). (FIG. 4G-I) Preparation of 3D scaffolds by touch-spinning and simultaneous spraying of cells: (FIG. 4G) The fiber drawn by the rod (1) is wound onto the frame (2) of a desired shape (a cuboid for example) attached to the spool. The spool can be tilted at any angle to wind fibers onto frames with complicated geometries. (FIG. 4H) Fibers are wound onto the frame with a controlled density (3) that can be regulated by the motion of the spool that shuttles back and forward. NIH-3T3 mouse fibroblast cells (4) are sprayed onto the frame simultaneously with winding of fibers. (FIG. 4I) 3D scaffold is made of the highly cellularized fiber meshes (5). (FIG. 4J-N) Different shapes and sizes of 3D-scaffolds obtained by winding nanofibers onto supporting frames mounted on a spool.

EXAMPLE 6: The mechanical properties of PCL fibers were measured by a three-point bending test using AFM. 15 cm-long fibers were produced by touch-spinning, frozen in liquid nitrogen and cut on a glass substrate with a scalpel. Fiber fragments were transferred on a wet silicon calibration grating sample (with 5 µm trench width and 200 nm depth) by pressing it against the glass slide with the cut fiber fragments. After drying, the sample was scanned in the ScanAssyst mode to determine the topography and in the ramp mode for the force-distance (FD) curves. We used a soft AFM probe for high sensitivity and to avoid indentation of fibers. The spring constant and the deflection sensitivity of the probe were found to be 0.46 N/m and 51.7 nm/V, respectively.

The AFM tip was used to apply a small deflection at the middle of the fiber suspended over the trench. The displacement of the fiber under load was calculated from two force-distance (FD) measurements. The first FD curve was recorded for the hard silicon substrate surface while the second plot was obtained for the deflection at the middle of the hanging fiber with the same maximum force as that for the first FD curve. The difference in the vertical scanner displacement is a fiber deflection at the midpoint. FD measurements were repeated 5 times for each of the fibers. The maximum applied force was set at 22 nN with a scanning speed of 0.5 Hz and a ramp size of 200 nm. The Young's modulus E was calculated using the beam-bending equation for a beam with two ends fixed outside the trench as(28)

$$E = \frac{FL^3}{192\Delta z I}$$

where F is the force applied, L is the suspended length, $\Delta z$ is the deflection of the beam at the middle point, $I=\pi D^4/64$, and D is the beam diameter. The diameter and suspended length were measured using the topography images.

Figures 6A, 6B:
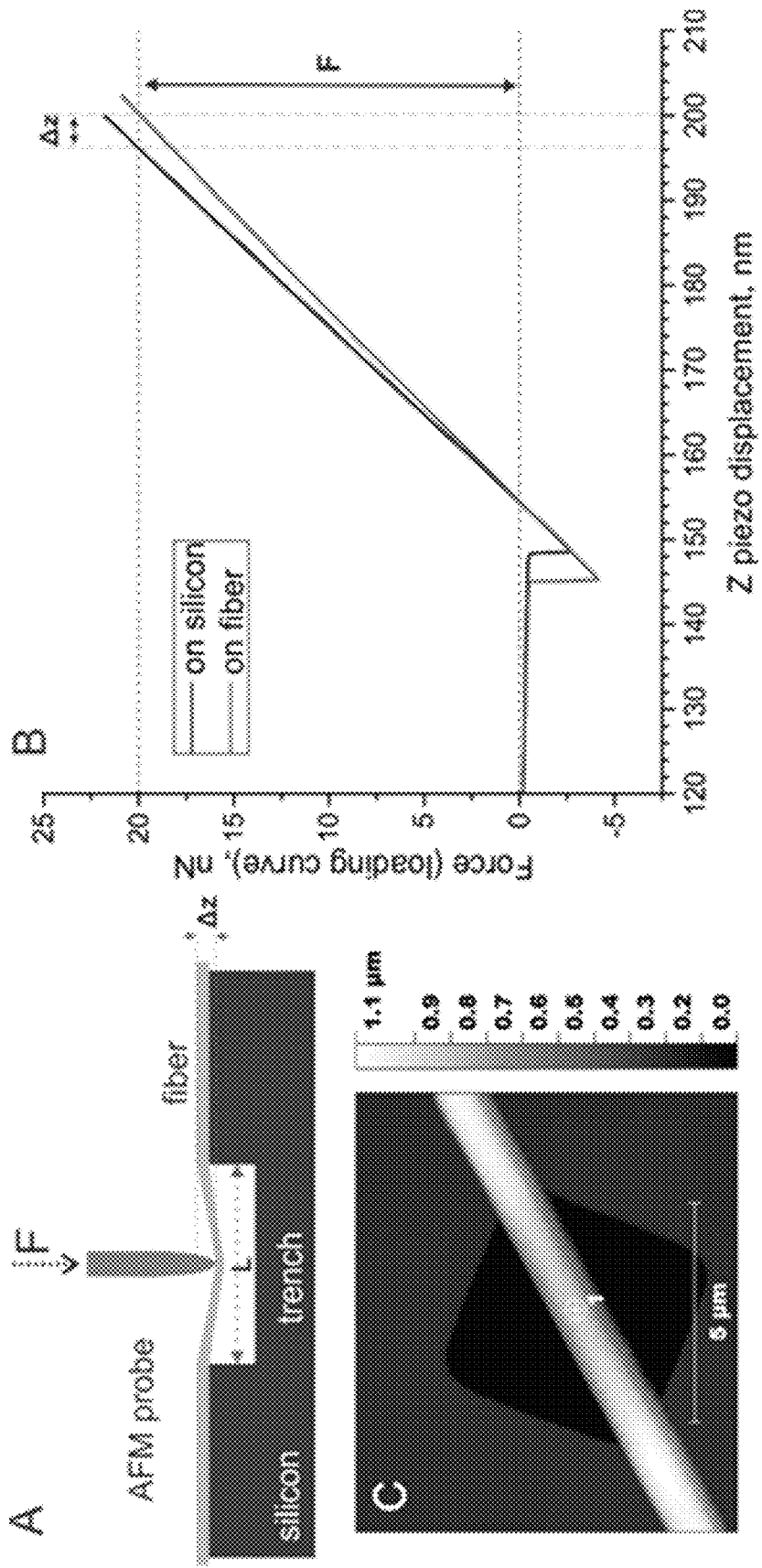

The Young's modulus E for PCL fibers with diameter in the range from 650 to 800 nm was found to be 0.26±0.08 GPa, which is in the same range as that for PCL fibers produced by the electrospinning method (28). Results are shown in FIGS. 6A-B.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method of spinning a nanofiber comprising feeding a nanofiber-forming solution to an apparatus comprising a cylinder rotatably mounted on a spindle comprising an outer wall, a rod comprising an outer end and a fixed end wherein the fixed end is mounted on the outer wall, wherein the outer end of the rod is configured to touch the nanofiber forming solution while rotating about an axis defined by the spindle; and wherein the nanofiber forming solution is fed onto a surface located beneath the spindle at a distance sufficient to be contacted by the outer end of the rod when rotating about the axis defined by the spindle.

2. The method of claim 1 wherein a length of the rod is from 0.2 to 10 cm.

3. The method of claim 1 wherein a plurality of rods is fixed to the outer wall at a density of from $10/cm^2$ to $100/cm^2$.

4. The method of claim 1 wherein the cylinder may rotate from 20 revolutions/min (RPM) to 10000 RPM.

5. The method of claim 1 wherein the nanofiber forming solution is fed by operable connection to a syringe pump.

6. The method of claim 5 wherein a feed tube is operably connected to the syringe pump.

7. The method of claim 1 wherein the nanofiber-forming solution has a polyethylene oxide concentration from about 3.5% to about 9% by weight.

8. The method of claim 7 wherein a diameter of the fiber increases with an increase in the polyethylene oxide concentration.

9. The method of claim 1 wherein the nanofiber is a polyethylene oxide nanofiber.

10. An apparatus comprising a cylinder rotatably mounted on a first spindle comprising an outer wall, and a winding rod comprising an outer end and a fixed end wherein the fixed end is mounted on the outer wall, wherein the outer end of the rod is configured to touch a nanofiber forming solution while rotating about an axis defined by the first spindle and offset from an axis defined by the first spindle; and wherein the winding rod is configured to rotate about a 3d-nanofiber building template rotatably mounted on a second spindle; wherein the nanofiber forming solution is fed onto a surface located beneath the first spindle at a distance sufficient to be contacted by the outer end of the winding rod when rotating about the axis defined by the first spindle.

11. The apparatus of claim 10 wherein the nanofiber forming solution comprises a polyethylene oxide.

12. A method of forming a nanofiber structure comprising feeding a nanofiber-forming solution to:

an apparatus comprising a cylinder rotatably mounted on a first spindle comprising an outer wall, and a winding rod comprising an outer end and a fixed end wherein the fixed end is mounted on the outer wall, wherein the outer end of the rod is configured to touch a nanofiber forming solution while rotating about an axis defined by the first spindle and offset from an axis defined by the first spindle; and wherein the winding rod is configured to rotate about a 3d-nanofiber building template rotatably mounted on a second spindle; wherein the nanofiber forming solution is fed onto a surface located beneath the first spindle at a distance sufficient to be contacted by the outer end of the winding rod when rotating about the axis defined by the first spindle; and rotating the flat stage about the first spindle such that a nanofiber is spun to a predetermined diameter.

13. The method of claim 12 wherein the nanofiber is a polyethylene oxide nanofiber.

14. The method of claim 12, wherein the nanofiber-forming solution has a polyethylene oxide concentration from about 3.5% to about 9% by weight.

* * * * *